G. MOERSCHEL, Jr.
LOCK FOR GREASE PLUG CAPS.
APPLICATION FILED JUNE 2, 1916.

1,197,223.

Patented Sept. 5, 1916.

Witnesses
Fenton S. Belt
J. W. Sherwood

Inventor
George Moerschel, Jr.
By Franklin N. Hough
Attorney

UNITED STATES PATENT OFFICE.

GEORGE MOERSCHEL, JR., OF MILWAUKEE, WISCONSIN.

LOCK FOR GREASE-PLUG CAPS.

1,197,223.           Specification of Letters Patent.     Patented Sept. 5, 1916.

Application filed June 2, 1916.   Serial No. 101,428.

*To all whom it may concern:*

Be it known that I, GEORGE MOERSCHEL, Jr., a citizen of the United States, residing at Milwaukee, in the county of Milwaukee and State of Wisconsin, have invented certain new and useful Improvements in Locks for Grease-Plug Caps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in devices for preventing grease cap plugs from loosening and consists of a simple and efficient device of this nature, which will be hereinafter fully described, shown in the accompanying drawings and then specifically defined in the appended claims.

My invention is illustrated in the accompanying drawings, in which:—

Figure 1:
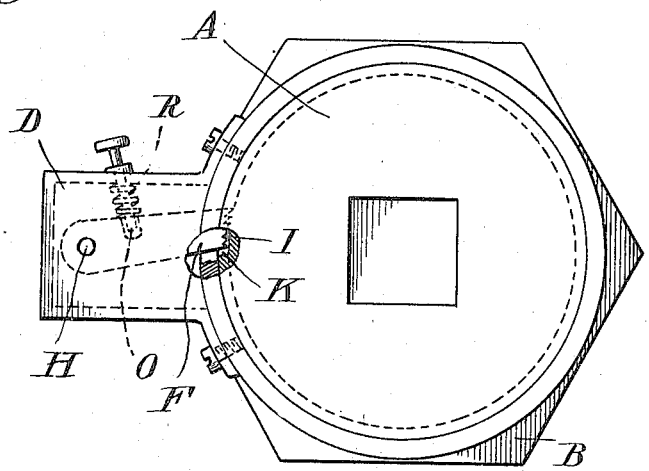
Figure 2:
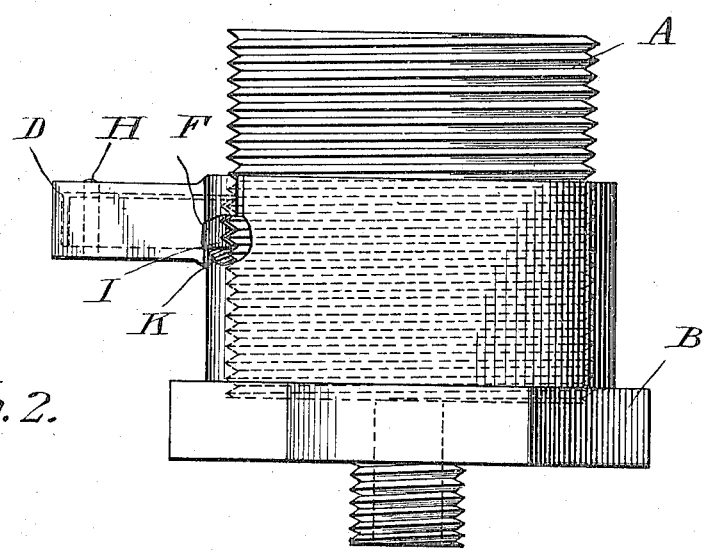

Figure 1 is a top plan view showing the device as applied to a grease plug screw. Fig. 2 is a side elevation.

Reference now being had to the details of the drawings by letter, A designates a threaded plug of a grease cup and B the screw cap therefor, the circumference of which is provided with a boxing D in which a locker member F is mounted upon a pin H, the free end of said screw being provided with serrations I designed to intermesh and cut into the threads K of the screw A. A spring-pressed pin O engages said locker and the tension of the spring R thereon serves to hold the teeth of the locking member in frictional engagement with the teeth of the screw at an angle so that the screw will not turn in a reverse direction without first releasing the locker from the threads.

By the provision of a device embodying the features of my invention, it will be noted that a simple and efficient means is afforded whereby the caps to the plugs of grease cups may be securely held from loosening and becoming lost.

What I claim to be new is:—

1. In combination with a screw plug of a grease cup, a threaded cap fitted thereto, a boxing upon said cap, a pin carried by the boxing, and a locker member pivotally mounted upon the pin and having serrations for engagement with the threads of the plug.

2. In combination with a screw plug of a grease cup, a threaded cap fitted thereto, a boxing upon said cap, a pin carried by the boxing, a locker member pivotally mounted upon the pin and having serrations for engagement with the threads of the plug, and a spring-pressed pin mounted upon the boxing and engaging said locker member.

In testimony whereof I hereunto affix my signature in presence of two witnesses.

GEORGE MOERSCHEL, JR.

Witnesses:
EDWARD REICHWALD,
PAUL DALLMANN.

Copies of this patent may be obtained for five cents each, by addressing the "Commissioner of Patents, Washington, D. C."